United States Patent
Purchase et al.

(10) Patent No.: US 6,175,813 B1
(45) Date of Patent: Jan. 16, 2001

(54) CIRCUMFERENTIAL DIAMETER MEASURING APPARATUS AND METHOD

(75) Inventors: Mike R. Purchase; Robert L. Larsen, both of Muskegon, MI (US); Stephen K. Clough, Clearwater, FL (US)

(73) Assignee: Kaydon Corporation, Muskegon, MI (US)

(*) Notice: Under 35 U.S.C. 154(b), the term of this patent shall be extended for 0 days.

(21) Appl. No.: 09/124,522

(22) Filed: Jul. 29, 1998

(51) Int. Cl.[7] .................................................. G01B 11/08
(52) U.S. Cl. ........................ 702/157; 702/155; 33/555.1
(58) Field of Search .................................. 702/150, 151, 702/155, 158, 163, 170, FOR 124, 145, 146, 160, 33-35, 87, 94, 95, 152, 153, 156, 166-168, FOR 123, 125, 130, 135, 136, 144, 147-149; 33/1 PT, 549, 555, 555.1; 700/58, 60, 62, 64, 66, 114, 175, 182, 186, 187, 192, 195, 302, 303

(56) References Cited

U.S. PATENT DOCUMENTS

| | | | |
|---|---|---|---|
| 1,439,321 | 12/1922 | Page ........................................ 33/517 |
| 2,969,598 | 1/1961 | Voltaire et al. ....................... 323/223 |
| 3,144,718 | 8/1964 | Brehm ................................... 33/517 |
| 4,322,888 | 4/1982 | Garzione ............................... 33/542 |
| 4,347,667 | 9/1982 | Albertazzi ............................. 33/517 |
| 4,464,839 | 8/1984 | Sadeh ................................... 33/502 |
| 4,563,824 | * | 1/1986 | Baun ..................................... 33/568 |
| 4,586,145 | 4/1986 | Bracewell et al. ...................... 703/1 |
| 4,596,074 | 6/1986 | Allen ................................. 33/501.01 |
| 4,679,447 | 7/1987 | Sieradzki et al. .................... 73/865.8 |
| 4,700,484 | * | 10/1987 | Frank et al. ........................... 33/773 |
| 4,725,963 | * | 2/1988 | Taylor et al. ........................... 702/40 |
| 4,729,174 | 3/1988 | Caron et al. ............................ 33/504 |
| 4,821,425 | * | 4/1989 | Currie et al. ............................ 33/520 |
| 4,866,642 | 9/1989 | Obrig et al. .......................... 707/157 |
| 4,926,309 | 5/1990 | Wu et al. ............................... 700/29 |
| 5,131,166 | 7/1992 | Weber ................................... 33/832 |
| 5,317,811 | 6/1994 | Berwick ................................. 33/507 |
| 5,563,798 | 10/1996 | Berken et al. ........................ 700/218 |
| 5,694,339 | * | 12/1997 | Ishitoya et al. ...................... 702/167 |

FOREIGN PATENT DOCUMENTS

| | | |
|---|---|---|
| 204757 | 12/1956 | (AU) . |
| 253740 | 2/1988 | (DE) . |
| 58-70101 | 4/1983 | (JP) . |
| 62-231109 | 10/1987 | (JP) . |
| 3176608 | 7/1991 | (JP) . |

OTHER PUBLICATIONS

Thomas George B., and Ross L. Finney. Calculus and Analytic Geometry 8th Edition. pp. A–3—A–5.*

"Formscan Model 1600" (4 pages), Published by Federal Products Company, Instrumentation Group Esterline Technologies, Providence, Rhode Island, (No Date).

* cited by examiner

*Primary Examiner*—Marc S. Hoff
*Assistant Examiner*—Manuel L. Barbee
(74) *Attorney, Agent, or Firm*—Price, Heneveld, Cooper, DeWitt & Litton

(57) ABSTRACT

An apparatus and method for automatically measuring the diameter of a part. A part to be measured is rotated through a plurality of measurement positions by an angle of rotation. A measuring device measures the radial distance from a surface point at each position of the part to the center thereof for each angle of rotation. The distance is calculated between successive points on the surface as a function of the measured radial distance of successive points along the surface and the angle of rotation between the measured points. A plurality of the distances as taken through a complete rotation of the rotational device is summed together to provide a circumference measurement of the part. A diameter measurement of the part is achieved by dividing the circumference by $\pi$.

21 Claims, 4 Drawing Sheets

CIRCUMFERENTIAL DIAMETER MEASURING APPARATUS AND METHOD

BACKGROUND OF THE INVENTION

The present invention is directed to measuring geometrical dimensions of a part and, more particularly, to a method and apparatus for measuring the diameter of a part, such as a ring.

Measuring the diameter of a ring has become an important step in the manufacture of a bearing. A number of known mechanical measurement techniques exist for measuring the diameter of a part. The mechanical measuring techniques commonly include the use of air gauges, calipers, micrometers, and pi tapes, to name a few. The pi tape measurement approach uses a measuring tape that includes the π function included with the dimensional units in inches or centimeters, such that the circumferential measurement units are divided by the well-known ratio of circumference of a circle to its diameter, e.g., π=3.14159265. As the pi tape is physically wrapped around the measured circumferential surface of the part, the measurement units provide an actual part measurement converted on the tape to a diameter unit. The caliper and micrometer measurement techniques likewise include mechanical methods of taking actual physical measurements to measure the diameter of the part.

In lieu of the mechanical techniques, a more recent approach called a coordinate measuring machine has been developed and used to establish coordinates for a given part surface. The coordinate measuring machine uses an algorithm to approximate the diameter of the part. This is generally accomplished by way of a "best fit" approach in which the circumference of the part is approximated and matched up with a best fit circle. However, the coordinate measuring machine only provides an approximate dimension and can be adversely affected by a non-round shape of the part, as well as various features that may be present on the measured part.

Accordingly, there is a need to provide for an accurate measuring apparatus to measure the diameter of a part quickly and with high reliability. Further, there is a need to provide for such a measuring apparatus and method that can achieve accurate measurements of parts that are out of round, and particularly for a ring shaped part.

SUMMARY OF THE INVENTION

The present invention improves the accuracy and automation for measuring the geometric dimension of a part such as the diameter of a ring shaped part. To achieve this and other advantages, and in accordance with the purpose of the invention as embodied and described herein, the present invention provides for an apparatus and method for measuring the geometric dimension of a part. The apparatus includes a rotational device for holding a part to be measured and for rotating the part through a plurality of angular positions. A measuring device measures distance from each of the plurality of angular positions on the measured surface of the part to the center of the part as measurements are taken along the surface of the part at each successive angular position. A distance is calculated between successive measured positions on the part as a function of the measured radii and angle of rotation between successive angular positions. A plurality of the distances as taken through a complete rotation of the rotational device are summed together to provide a circumference measurement of the part. A diameter measurement of the part is determined by dividing the circumference measurement by π.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
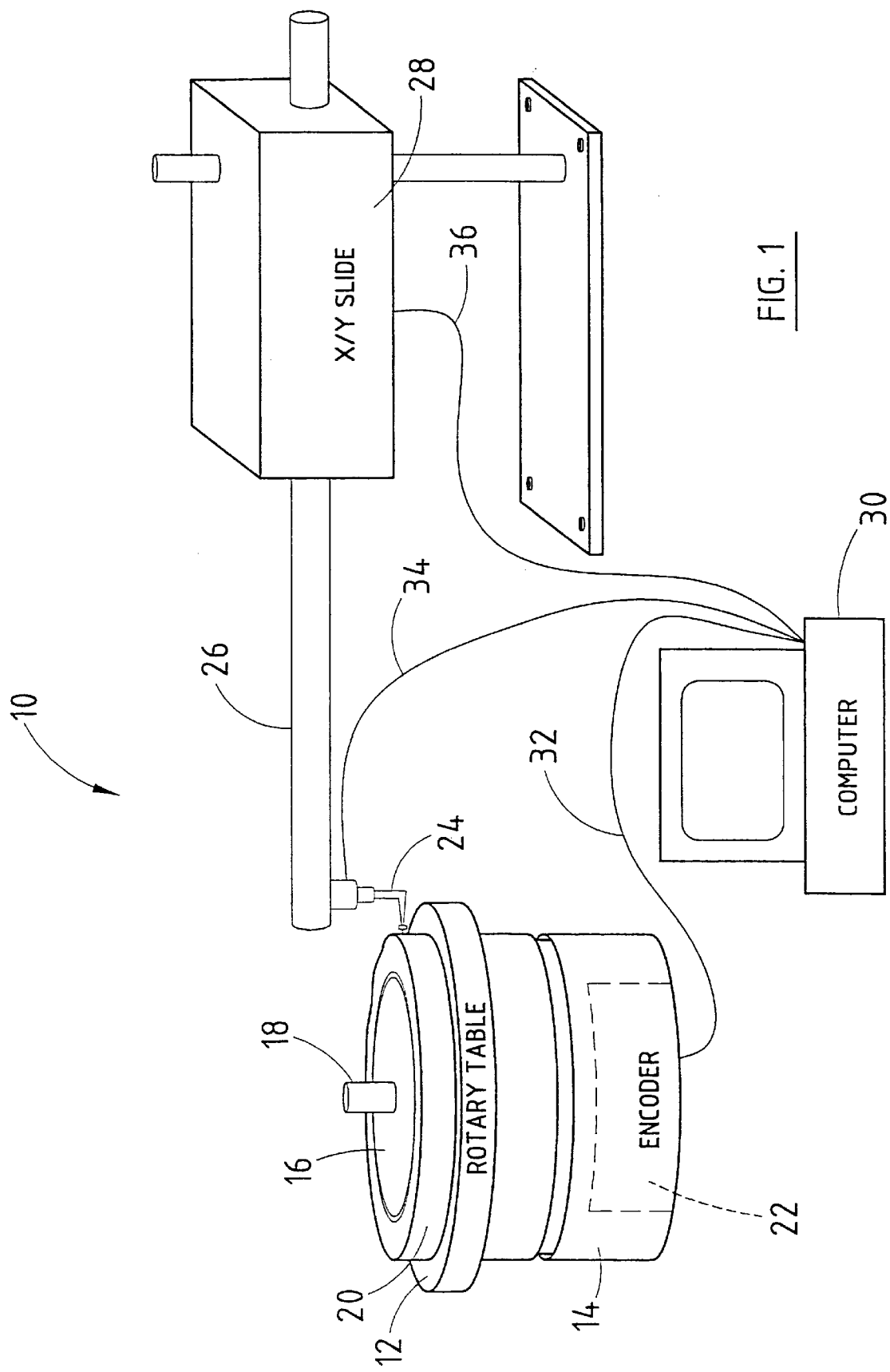
FIG. 1 is a schematic diagram illustrating the circumferential diameter measuring machine for measuring diameter of a part according to the present invention.

Referring to FIG. 1, a circumferential diameter measuring machine 10 is illustrated for measuring one or more geometric dimensions of a part. The circumferential diameter measuring machine 10 as illustrated and described herein is particularly suitable for use to determine the outside diameter of a part, such as ring 20, by measuring the outer circumference of the ring 20. It should be appreciated that the measuring machine 10 may likewise be utilized to measure an inside surface circumference and inside diameter of the ring 20. Further, while the present invention measures a geometrical dimension of a ring, the principles of the present invention may likewise be applicable to measuring the geometry of various parts having different shapes and sizes.

The circumferential diameter measuring machine 10 includes a rotary table 12 rotatable about a base 14 and preferably positioned along a level horizontal plane. Included with rotary table 12 is an encoder 22 and a motor (not shown) for controlling and actuating the rotational movement of rotary table 12. Rotary table 12 is accurately rotated continuously to present part for measurement at multiple points throughout a complete 360 degree rotation. In doing so, encoder 22 sends a signal to the computer 30 via line 32 indicating the rotation of table 12 by an θ angle in radians for a predetermined number of angular intervals. Accordingly, encoder 22 notifies computer 30 of each successive rotation by angle θ so that computer 30 can record a position measurement at each successive rotation of angle θ.

The rotary table 12 contains a centering disk 16 centrally disposed on the top surface thereof. The centering disk 16 is positioned on top and centered about the rotary table 12 and is adapted to receive a part, such as ring 20, at the outer perimeter of centering disk 16. The use of centering disk 16 allows ring 20 to be aligned on rotary table 12 so that its center is substantially at the center of rotary table 12. A pilot pin 18 is vertically disposed upward from the center of rotation of rotary table 12, and thereby also defines the center of the ring 20. Pilot pin 18 is cylindrical and has a known radius so that the location of its outer perimeter may be sensed and the center of rotary table 12 can be determined by adding the distance of the known radius of pilot pin 18 to the sensed perimeter location.

The measuring machine 10 further includes a linear variable differential transformer (LVDT) 24 for measuring the radial displacement along the outer circumferential surface of ring 20. The LVDT 24 is an electromechanical transducer device that produces an electrical output voltage proportional to the displacement of the tip of the probe of the LVDT 24. The radial displacement is measured by the LVDT 24 for each increment of angular rotation θ, as registered by the encoder 22, and recorded by the computer 30. The displacement measuring device 24 is mounted to an X/Y slide member 28 and connecting arm 26 as shown. The tip of the probe of the LVDT 24 is spring biased against the surface to be measured and senses the radial position displacement (ΔX) of the surface of part 20 to produce a proportional voltage output which is sent to computer controller 30 via line 34.

It should be appreciated that the displacement measuring device 24 could alternately include other contact type position sensing devices as well as non-contact position sensing devices. For instance, displacement measuring device 24 could include the use of a laser, an air gauge, electronic gauges, or other proximity measuring devices to acquire position measurements as set forth herein.

The displacement measuring device 24 is radially movable both toward and away from the center of rotary table 12 by use of the X/Y slide member 28 and contacting arm 26. Displacement measuring device 24 is utilized to measure the localized radial movement ΔX of the surface of ring 20 at each interval of angular rotation θ from the initial measured point. The localized radial movement ΔX is compared to the center of rotary table 12, which defines the center of ring 20, as established through the X/Y slide member 28 to determine the radius at that measured position. To determine the initial radius Ri measurement, the displacement measuring device 24 is first positioned so that its contact probe is in contact with the perimeter of pilot pin 18, which is at the center of rotation. The LVDT displacement measuring device 24 should be positioned against the pilot pin 18 near midrange which is the midpoint of the spring biased probe's displacement. At this point, both the LVDT measuring device and X/Y slide's position are set to zero. The LVDT displacement measuring device 24 is then moved radially outward and positioned to contact the measurement surface of ring 20 by moving the X/Y slide member 28. The X/Y slide member 28 is moved so that the probe of the LVDT measuring device 24 is biased against ring 20 near its midrange of the probe's displacement. The LVDT's initial starting position ΔXi is then recorded. The initial radius Ri measurement is then calculated by adding the value of the X/Y slide member movement to the known radius of the pilot pin 18, and is adjusted for by the LVDT's initial starting position ΔXi, taking into account the proper sign convention.

Additionally, it is possible to provide a predetermined known calibrating device for initially setting the position of the center of rotary table 12 without requiring extended motion of the X/Y slide member 28 and connecting arm 26. This may be achieved by using a known length measuring bar positioned between the pilot pin 18 and extending towards the position measuring device 24 to provide a known distance from which the displacement measuring device 24 may determine the initial radius measurement. According to this procedure, the initial radius Ri measurement is equal to the X/Y slide member movement summed with the known pilot pin radius and the measuring bar length and adjusted for by the LVDT's initial starting position ΔXi, taking into account proper sign convention.

Figure 2:
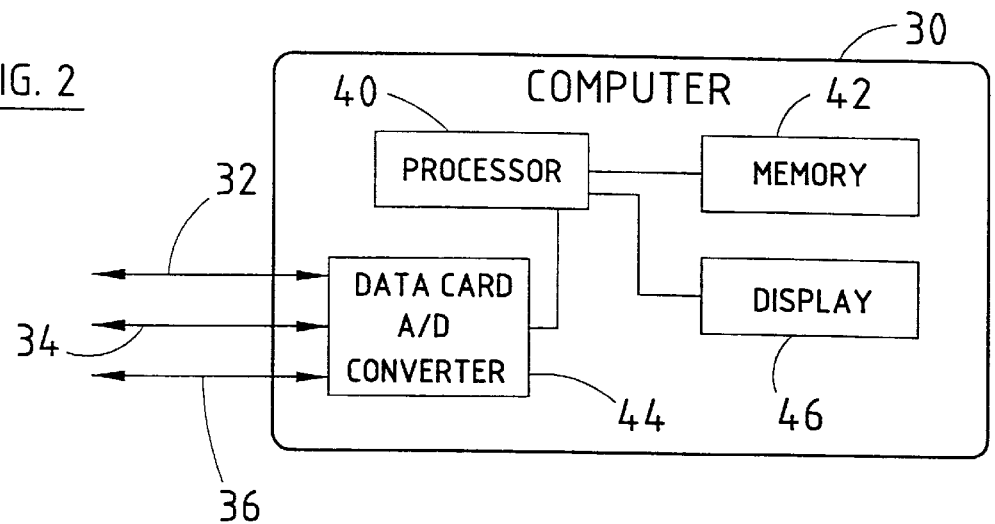
FIG. 2 is a block diagram illustrating the control hardware employed in connection with the measuring machine of FIG. 1.

The computer controller 30 receives and records the position measurements taken by the LVDT measuring device 24 at each increment of angular rotationθ, processes the measurements, and computes the circumference and diameter of the part 20. Referring to FIG. 2, the hardware configuration of computer controller 30 is illustrated according to one example. Computer controller 30 includes a processor 40 which may include an arithmetic logic unit (ALU) or other processing device capable of executing the processing algorithms of the present invention. The computer controller 30 is provided with memory 42 for storing programmable algorithms and for storing collected and processed data. A display 46 allows an operator to view the recorded data, as well as the measured circumference and computed diameter of part 20. In addition, computer 30 may include a data card with an analog-to-digital converter 44 for converting analog data signals input on lines 32, 34, and 36 to digital signals. It should be appreciated that the computer controller 30 may include a general purpose computer programmed to execute the method of the present invention as described herein.

Figure 3:
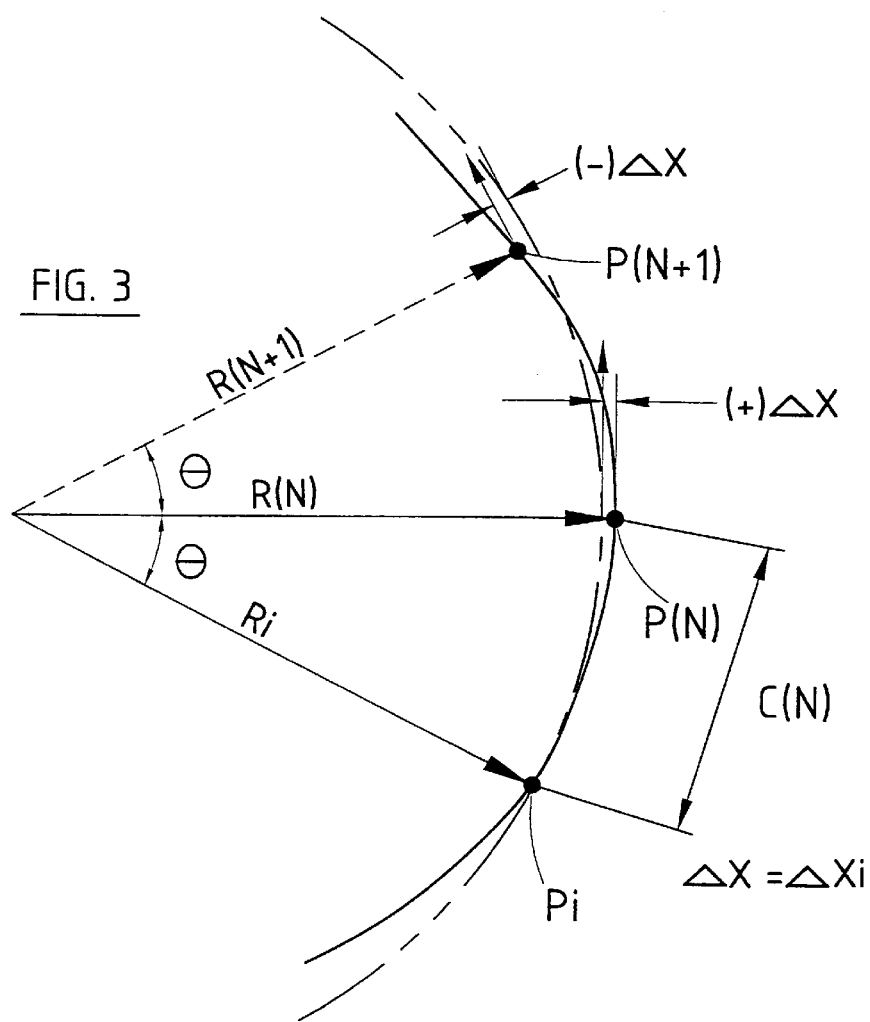
FIG. 3 is a schematic diagram illustrating incremental measurements taken on the surface of the ring for measuring chord length with the apparatus and method of the present invention.

Referring to FIG. 3, position measurements are shown at each of three successive points Pi, P(N), and P(N+1) along the outside perimeter of ring 20 as measured by the circumferential diameter measuring machine 10 of the present invention. Initially, starting position measurement ΔXi on the surface of part 20 is measured to acquire the initial radius Ri. As the rotary table 12 is rotated clockwise by the predetermined angle θ, the probe of the LVDT measuring device 24 is positioned at the next successive measurement point P(N) and the radial displacement ΔX value is measured by the LVDT position measuring device 24. The measured radial displacement ΔX is then added or subtracted from the initial radius Ri to arrive at the radius R(N) for the current measurement point P(N). The rotary table 12 continues to rotate clockwise by the predetermined angle θ to place the probe of LVDT position measuring device 24 on the next successive measurement point P(N+1). The radial displacement ΔX for measurement point P(N+1) is then measured and added or subtracted from the initial radius Ri to arrive at the radius R(N+1) for the current position P(N+1).

Based on the initial radius Ri and the successive position measurements at each increment of angular rotation θ, the machine and method of the present invention computes the radius R(N) at each position measurement and determines the circumferential length C(N) between each pair of successive positions taken throughout the entire perimeter of the part. According to one embodiment, the circumferential length is determined by the chord length between successive measured points. For very small angles θ of rotation, the chordal measurement closely approximates the circumference between successive measurement points, thereby resulting in a circumference and diameter measurement with good accuracy and repeatability. All the chord lengths C(N) taken throughout a 360 degree rotation of rotary table 12 are summed together to provide a measurement of the circumference of ring 20. The circumference is then divided by the ratio of circumference to diameter of a circle (π), which has a value of 3.14159265, to provide an accurate diameter measurement of the ring 20.

Figure 4:
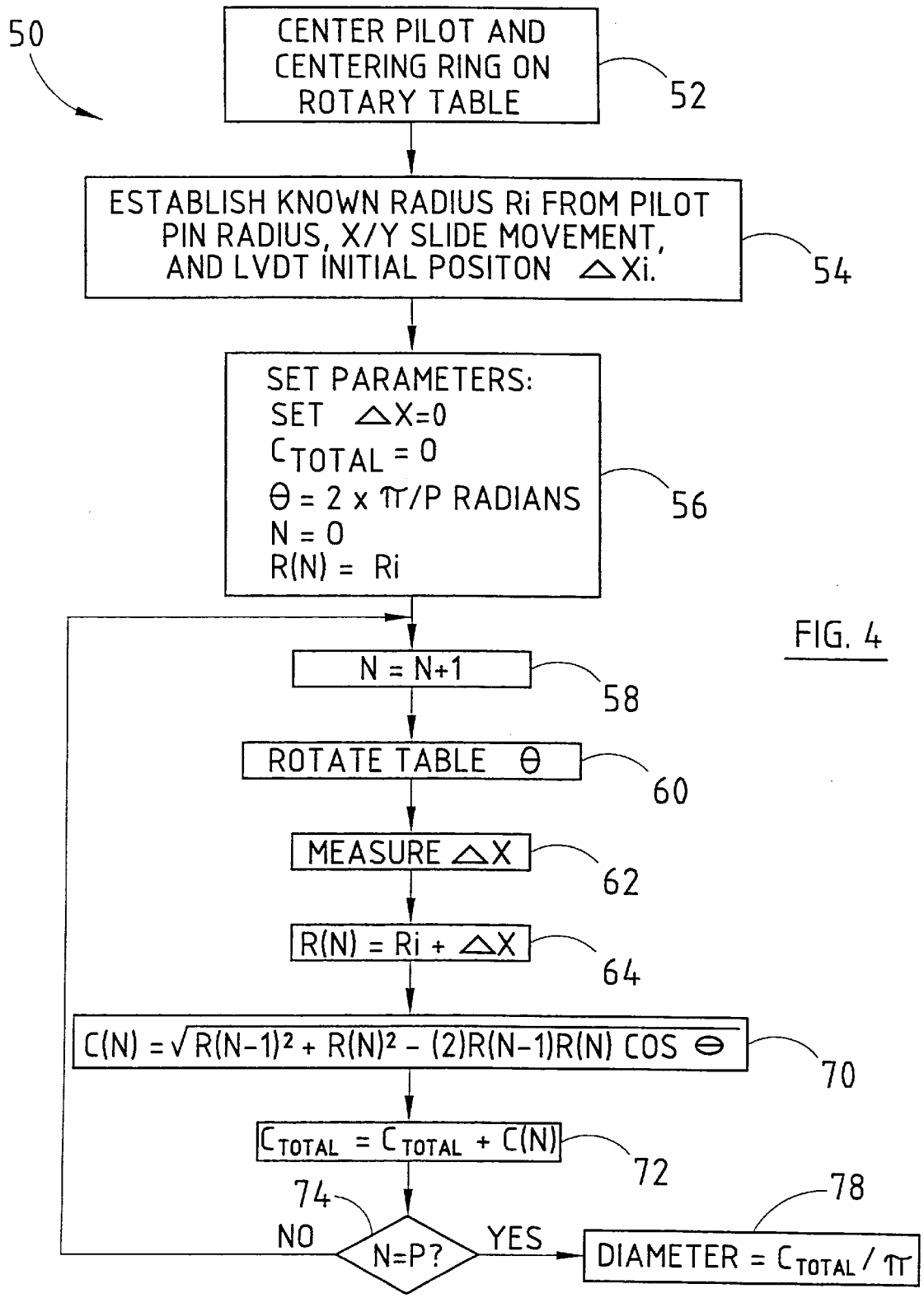
FIG. 4 is a flow diagram illustrating a methodology of measuring the circumferential diameter of a part with the measuring machine of the present invention.

With particular reference to FIG. 4, a method 50 of measuring the ΔX diameter of a part with the circumferential diameter measuring machine 10 is illustrated therein according to one embodiment of the present invention. The measuring methodology 50 includes a step 52 of centering the pilot pin 18 and part 20 to be measured on rotary table 12. Next, step 54 provides for establishing the known radius Ri which extends from the center of pilot pin 18 to the measurement surface of part 20 at the first position to be measured. This is accomplished by using the X/Y slide member to position the LVDT measuring device 24 against both the pilot pin 18 and ring 20 and calculating the initial radius Ri as described above. Additionally, in step 56, a number of parameters are set which include setting ΔX=0, setting the summed chord total $C_{total}$ 32 0, setting θ=2π÷P, where P=the number of position measurements taken for a 360 degree rotation, setting N=0, setting R(N)=Ri. It should be appreciated that the angle 74 of rotation is preferably always of the same value throughout a part measurement and is defined by the number of measured points P that are to be measured for a given part. According to one example, 4,096 measured points may be taken through a 360 degree rotation of the part at angular intervals of angle θ=0.00153398 radians. It should also be appreciated that a higher resolution and a higher accuracy may be achieved with a larger number of measurement points.

Once the above-identified parameters have been set and the initial radius Ri has been measured, the methodology 50 proceeds to measure successive chord lengths C(N) between successive position points on the surface of ring 20. In step 58, N is indexed by 1. In step 60, the rotary table 12 is rotated by the predetermined incremental angle θ and, following the rotation of rotary table 12 by angle θ, a measurement of the change in radius, referred to as radial displacement ΔX, is taken at the next successive position as shown in step 62. In step 64, a new position radius R(N) is set for the current position and is equal to the radial displacement measurement ΔX added to the initial measured radius Ri.

Given angle θ and the two successive position radius measurements R(N) and R(N−1), methodology 50 proceeds to calculate the chord length C(N) between the two successive position measurements. In step 70, methodology 50 calculates the chord length C(N) in accordance with the following equation:

$$C(N)=\sqrt{R(N-1)^2+R(N)^2-(2)R(N-1)R(N)\cos\theta}$$

Accordingly, the chord length C(N) is computed for the distance between the current position N and the one previous measured position (N−1) to provide a distance between measured points. In effect, the chord length C(N) is a very small distance taken between two very close points, which when summed together with all chord lengths through a 360 rotation provides an accurate measurement of the circumference of the part. This chord length measurement C(N) is added to the running total of the circumference measurement $C_{total}$ as provided in step 72. In step 74, methodology 50 checks to see if N is equal to the total number of position measurements (P) that are to be made for a 360 degree measurement of part 20. If the position measurements are not complete, methodology 50 proceeds to loop back to step 58 to repeat the chord measurement for the next successive pair of points on part 20. Once methodology 50 has completed all position measurements on part 20, the circumference measurement total $C_{total}$ is the measurement of the circumference of part 20. The circumference measurement $C_{total}$ is further divided by π=3.14159265 as provided in step 78 to provide the measured diameter of part 20.

Accordingly, the circumferential diameter measuring machine 10 and method 50 of the present invention advantageously provide for accurate and efficient measurement of the geometric dimension of a part, and more particularly provide for quick and accurate circumference and diameter measurement of a ring.

Figure 5:
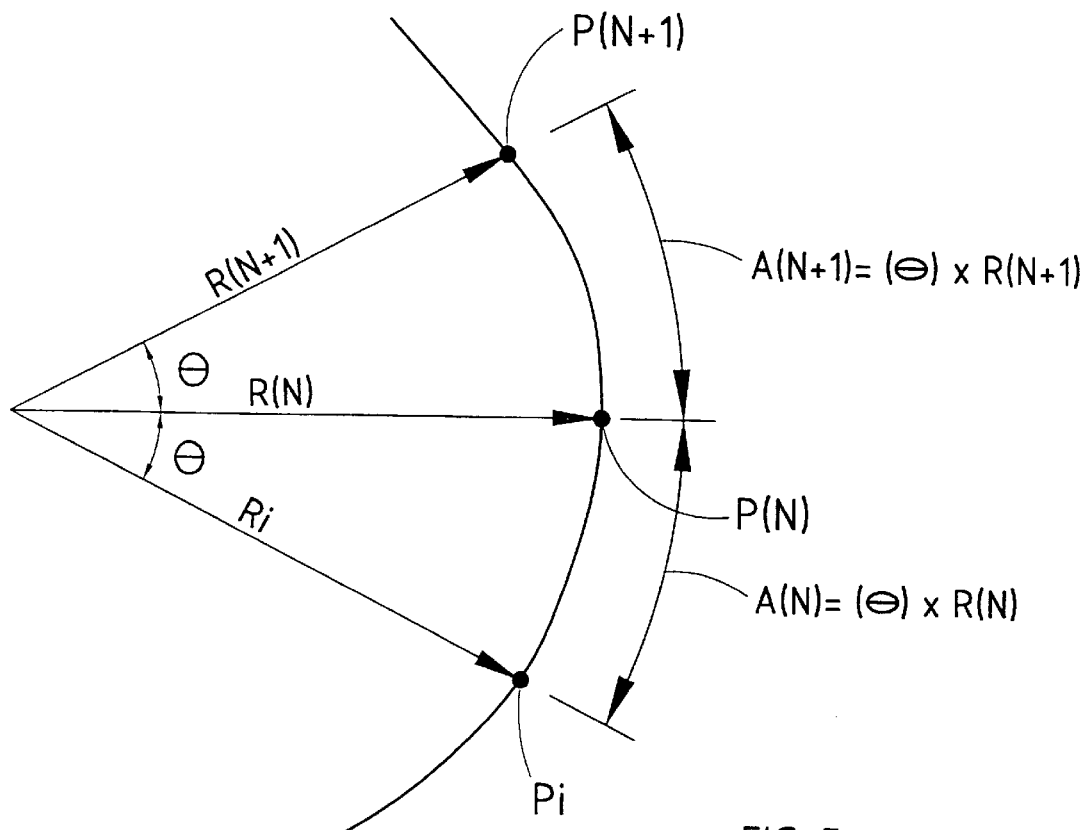
FIG. 5 is a schematic diagram illustrating measurements taken on the surface of the ring for measuring arc length according to another embodiment.
Figure 6:
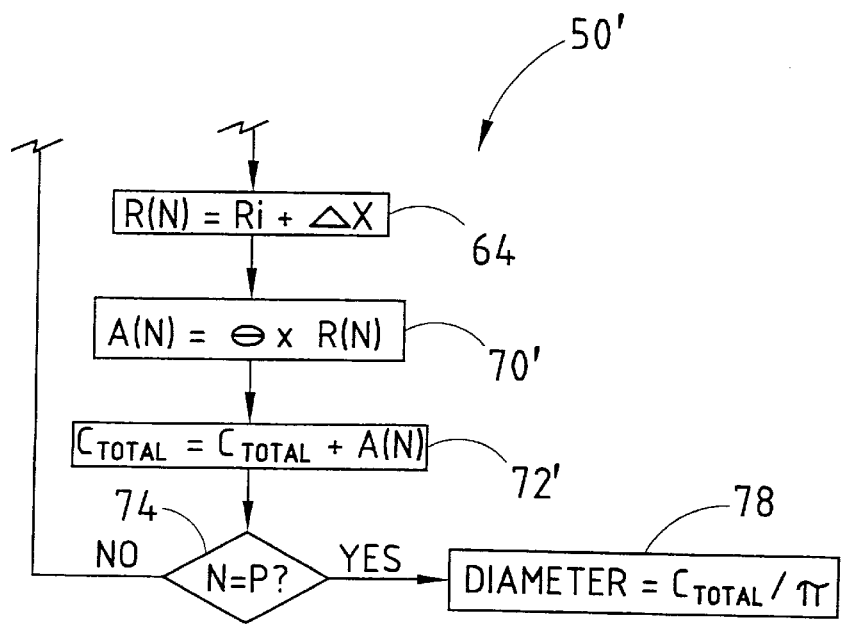
FIG. 6 is a partial flow diagram illustrating the methodology of measuring the circumferential diameter of a part according to the arc length measurement embodiment.

According to a second embodiment of the present invention, the circumferential distance between successive measured points may be determined as an arc length, in lieu of the chord length calculation. Referring to FIG. 5, an illustration is provided for calculating the arc length between successive measured points. The arc length A(N) is computed at each point such as points Pi, P(N), P(N+1) as well as the following successive measured point separated by angle θ. Referring to FIG. 6, the methodology 50' is shown according to the second embodiment in which the arc length is computed in step 70' according to the following equation:

$$\text{Arc length } A(N)=\theta\times R(N)$$

Where R(N) equals the measured radius at the current position N measurement and angle θ is the rotated angle provided in radians. In step 72', methodology 50' sums the total arc lengths A(N) to provide for the circumference measurement total $C_{total}$, which is then used to determine the diameter of the part. Thus, different algorithms could be used to measure the distance between measured points along the diameter of the ring 20 such as calculating successive chord lengths or successive arc lengths between measured points.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An apparatus for measuring the geometric dimension of a part comprising:

a rotational device for holding a part to be measured and for rotating said part about its center through a plurality of positions, said rotational device including a rotary table comprising a centering device having a centering disk for centering said part and a pin for defining a center location;

a measuring device for measuring a radial distance from the center of the part to each of a plurality of surface points on said part as said part is rotated through angular measurement positions separated by an angle of rotation, said measuring device including a first measuring device for measuring an initial radial distance from the center of said part to an initial surface point on said part and a second measuring device for measuring radial displacement from said initial radial distance measurement to each measured point on said part, wherein said first measuring device comprises a linear slide device for measuring linear displacement from said initial surface point to said center of said part; and a controller for calculating a circumferential distance between successive measured points measured on said part as a function of the measured radial distance at each measured point and said angle of rotation, said controller further summing a plurality of said circumferential distances taken through a 360 degree rotation of said part to provide a circumference measurement of said part.

2. The apparatus as defined in claim 1, wherein said calculated circumference measurement is divided by π to provide a diameter measurement of said part.

3. The apparatus as defined in claim 1 further comprising an encoder for detecting rotation of said rotational device by each said angle of rotation, wherein said controller records a radial distance for each detected angular rotation.

4. The apparatus as defined in claim 1, wherein said second measuring device comprises a linear variable differential transformer for measuring said radial displacement.

5. The apparatus as defined in claim 1, wherein said controller computes a chord length as said circumferential distance between successive measured points.

6. The apparatus as defined in claim 5, wherein said controller computes said chord length as a function of $\sqrt{a^2+b^2-2(a)(b)(\cos\theta)}$, wherein a is the calculated radius at one measured point and b is the calculated radius measurement at the next consecutive measured point and θ is the angle of rotation.

7. The apparatus as defined in claim 1, wherein said controller computes an arc length as said circumferential distance between successive measured points.

8. The apparatus as defined in claim 7, wherein said controller computes said arc length as a function of a×θ, wherein a is the calculated radius at said measured point and θ is the angle of rotation.

9. An apparatus for measuring a geometric dimension of a ring comprising:
   a rotational device for holding a ring to be measured and for rotating said ring about its center and through a plurality of positions, said rotational device including a rotary table comprising a centering device having a disk for centering said ring and a pin for defining a center location;
   an angular detector for detecting successive rotations of said rotational device by an angle of rotation;
   a first measuring device for measuring an initial radial distance from the center of said ring to an initial surface point on said ring, said first measuring device comprising a linear slide device for measuring linear displacement from said initial surface point to said center of said ring;
   a second measuring device for measuring radial displacement at each measured point from the initial surface point measurement; and
   a controller for measuring the radial distance from each measured surface point to said center of said ring at multiple points of rotation of said ring, said controller calculating a circumferential distance between successive points measured on said ring as a function of the measured radial distance of said successive measured points and said angle of rotation, said controller further summing a plurality of said circumferential distances taken through a 360 degree rotation of said rotational device to provide a circumference measurement of said ring.

10. The apparatus as defined in claim 9, wherein said controller divides said circumference measurement by π to provide a diameter measurement of said ring.

11. The apparatus as defined in claim 9, wherein said angular detector comprises an encoder.

12. The apparatus as defined in claim 9, wherein said controller computes a chord length as said circumferential distance between successive measured points.

13. The apparatus as defined in claim 12, wherein said controller computes said chord length as a function of $\sqrt{a^2+b^2-2(a)(b)(\cos\theta)}$, wherein a is the calculated radius at one measured point and b is the calculated radius measurement at the next consecutive measured point and θ is the angle of rotation.

14. The apparatus as defined in claim 9, wherein said controller computes an arc length as said circumferential distance between successive measured points.

15. The apparatus as defined in claim 14, wherein said controller computes said arc length as a function of a×θ, wherein a is the calculated radius at one point and θ is the angle of rotation.

16. A method for measuring the diameter of a part, said method comprising the steps of:
   placing a part to be measured on a rotary table having a centering device having a centering disk for centering said part and a pin for defining a center location;
   rotating the part to be measured on the rotary table about its center and through a plurality of positions by an angle of rotation;
   measuring an initial radial distance from the center of said part to an initial surface point on said part with a first measuring device having a linear slide device for measuring linear displacement from said initial surface point to said center of said part;
   successively measuring radial distance from a surface point at each position of said part to the initial radial distance measurement for each angle of rotation of said part with a second measuring device;
   calculating a circumferential distance between successive measured points on said part as a function of the measure radial distance and said angle of rotation;
   summing a plurality of said circumferential distances taken through a complete rotation of said part to provide a circumference measurement of said part; and
   dividing said circumference measurement by π to provide a diameter measurement of said part.

17. The method as defined in claim 16, wherein said circumferential distance is computed as a chord length between successive measured points.

18. The method as defined in claim 17, wherein said circumferential distance is computed as a function of $\sqrt{a^2+b^2-2(a)(b)(\cos\theta)}$, wherein a is a radius measurement at one measured point and b is a radius measurement at the next successive measured point, and θ is the angle of rotation.

19. The method as defined in claim 16, wherein said circumferential distance is computed as an arc length between successive measured points.

20. The method as defined in claim 19, wherein said arc length is computed as a function of a×θ, wherein a is a displacement measurement at one point and θ is the angle of rotation between successive measured points.

21. A method for measuring the diameter of a ring, said method comprising the steps of:
   placing a ring to be measured on a rotary table having a centering device with a disk for centering said ring and a pin for defining a center location;
   rotating the ring to be measured about its center and through a plurality of positions by an angle of rotation;
   detecting successive rotations of said rotational device by an angle of rotation;
   measuring an initial radial distance from the center of said ring to an initial surface point on said ring;

measuring radial displacement of each measured point from said initial surface point measurement;

successively measuring radial distance from a surface point at each position of said ring to the center of said ring for each said angle of rotation of said ring;

calculating a circumferential distance between successive measured points on said ring as a function of the measured radial distance and said angle of rotation;

summing a plurality of said circumferential distances taken through a complete rotation of said ring to provide a circumference measurement of said ring; and dividing said circumference measurement by $\pi$ to provide a diameter measurement of said ring.

* * * * *

UNITED STATES PATENT AND TRADEMARK OFFICE
CERTIFICATE OF CORRECTION

PATENT NO. : 6,175,813 B1
DATED : January 16, 2001
INVENTOR(S) : Mike R. Purchase et al.

It is certified that error appears in the above-identified patent and that said Letters Patent is hereby corrected as shown below:

<u>Column 5,</u>
Line 15, "$C_{total}$ 32 0," should be -- $C_{total} = 0$, --.
Line 18, "74", should be -- $\theta$ --.

Signed and Sealed this

Second Day of October, 2001

Attest:

NICHOLAS P. GODICI
*Attesting Officer*    *Acting Director of the United States Patent and Trademark Office*